United States Patent [19]

Norris et al.

[11] Patent Number: 4,656,524

[45] Date of Patent: Apr. 7, 1987

[54] ELECTRONIC IMAGING COPIER

[75] Inventors: Philip R. Norris, North Reading; Wiliam B. Ware, Brighton, both of Mass.

[73] Assignee: Polaroid Corporation, Cambridge, Mass.

[21] Appl. No.: 812,112

[22] Filed: Dec. 23, 1985

[51] Int. Cl.⁴ ............................................. H04N 1/40
[52] U.S. Cl. .................................. 358/280; 358/284; 358/76; 358/909
[58] Field of Search .......... 358/280, 282, 284, 214.80, 358/75, 76, 903, 909, 20; 382/54; 354/3; 355/4, 5

[56] References Cited

U.S. PATENT DOCUMENTS

| | | | |
|---|---|---|---|
| 3,824,336 | 7/1974 | Gould et al. | 358/214 |
| 3,988,602 | 10/1976 | Gorsica, Jr. | 358/214 |
| 4,130,834 | 12/1978 | Mender et al. | 358/127 |
| 4,250,822 | 2/1981 | Seki et al. | 358/76 |
| 4,430,668 | 2/1984 | Miles, Jr. | 358/75 |
| 4,433,345 | 2/1984 | Haddick et al. | 358/244 |
| 4,463,373 | 7/1984 | Mikami | 358/76 |
| 4,488,244 | 12/1984 | Freeman | 364/525 |
| 4,536,848 | 8/1985 | d'Entremont et al. | 364/526 |
| 4,538,183 | 8/1985 | Kanno | 358/280 |
| 4,602,294 | 7/1986 | Yamada | 358/280 |

Primary Examiner—Edward L. Coles, Sr.
Attorney, Agent, or Firm—John S. Vale

[57] ABSTRACT

An electronic imaging copier is provided for making enhanced photographic copies of reflection print and transparency types of photographs. The copier initially operates in a preview display mode during which the operator may view and interactively make selected modifications to an electronic image of the photograph displayed on a display screen. Thereafter, the copier operates in a copy mode to make an enhanced photographic print of the displayed image.

16 Claims, 11 Drawing Figures

ELECTRONIC IMAGING COPIER

BACKGROUND OF THE INVENTION

The present invention relates to the field of photocopying and, more specifically, to an electronic imaging copier for making enhanced photographic prints from original reflective print and transparency (e.g. slide and/or negative) types of photographs.

Electronic imaging systems for recording still images on photosensitive film are well known in the prior art. For example, U.S. Pat. No. 4,130,834 discloses a system which uses a video camera to provide an electronic signal representation of the image to be recorded; means for enhancing the signals to adjust color balance, contrast, format etc; and a printing CRT which projects the enhanced image onto a film unit to make an enhanced print.

Other systems, sometimes referred to as electronic imaging film recorders, do not include image signal generating devices, but rather are adapted to receive image signals from various sources connected thereto such as a computer, video camera or video tape recorder.

Such film recorders typically may include signal processinq systems for adjusting brightness and contrast range; adjustment of color saturation and balance; image inversion (reverse video); adding text or graphic information to the picture; selective croping; and image magnification. For representative examples of this type of recorder, reference may be had to U.S. Pat. Nos. 4,433,345; 4,488,244 and 4,536,848.

Commonly assigned, copending application U.S. Ser. No. (804,595) filed on Dec. 4, 1985 by Philip Norris and entitled "Electronic Imaging Copier", discloses a copier designed for use in a photographic store or department and allows an operator to quickly and easily produce enhanced photographic copies of reflection prints and transparency photographs.

The copier operates first in a preview display mode and then in a copy mode. The preview display mode allows the operator to view an electronic image of the original photograph on a display device (e.g. a CRT) so he may evaluate the composition of the image that will be projected onto the copy film.

In the interest of increasing the versatility of such a copier, it would be highly desirable to provide the copier with the capability of allowing the operator to interactively modify the image during the preview display mode. Preferably, the operator would be allowed to change selected image defining parameters such as image magnification (zoom capability), format (e.g. selective cropping), and adjust contrast and/or brightness.

While the copier disclosed in the above noted application is relatively easy to use, it would be desirable to further improve ease of use by arranging certain of its components to make operator use more intuitive and less dependent on instruction and training materials.

Therefore, it is an object of the present invention to provide an electronic imaging copier for making an enhanced photographic copy of a photograph and which is configured to permit the operator to interactively view and make selected modifications, if desired, to an electronically displayed image of the photograph before the image is recorded on photosensitive film.

Another object of the invention is to provide such a copier that is easy to use and is specifically configured to induce intuitive operation of the copier.

Other objects of the invention will in part be obvious, and will in part appear hereinafter.

SUMMARY OF THE INVENTION

The present invention provides an electronic imaging copier for making an enhanced photographic copy of an original photograph. Preferably, the copier is configured to make copies of both reflection print and transparency types of photographs.

The copier is initially operable in an interactive preview display mode for viewing and selectively modifying an electronically displayed image of the photograph, and thereafter is operable in a copy mode for producing an enhanced copy.

The copier includes means for supporting a photograph at an object plane and optical means for providing an optical image of the supported photograph at an image plane.

The optical image is sensed by photoresponsive means, e.g a line scanning CCD device, which is selectively operable to provide, in sequence a first set of electronic image signals representative of a low resolution version of the image and a second set of electronic image signals representative of a higher resolution version of the image.

Memory means are provided for storing the first set of image signals, along with display means which are responsive to at least a portion of the first set of the signals for displaying a low resolution version of the image.

Interactive image modification is accomplished utilizing a first signal processor. The first signal processor is selectively operable during the preview display mode and is responsive to operator actuable input signals for processing that portion of the first set of the signals provided to the display means to modify selected image defining parameters. If modifications were made during the preview display mode, the final modifications are applied to subsequent signals in the first and second sets during the copy mode of operation.

Image enhancement is accomplished by the use of a second signal processor. This second processor processes the first and second sets of image signals, whether modified or not, to provide a third set of signals representative of an enhanced version of the image.

The copier further includes means for supporting a photosensitive film unit (for example, a self-developing film unit) at an exposure plane; and means responsive to the third set of signals for providing an optical image representative of the enhanced image and for projecting the enhanced image onto the exposure plane to record it on a film unit thereat.

Additionally, the copier has selected components, such as print, negative, and slide supporting stations, along with operator actuable control knobs and switches arranged in a manner which makes their use more intuitive.

BRIEF DESCRIPTION OF THE DRAWINGS

For a fuller understanding of the nature and objects of the present invention, reference may be had to the following detailed description taken in connection with the accompanying drawings wherein.

DESCRIPTION OF THE PREFERRED EMBODIMENT

Figure 1:
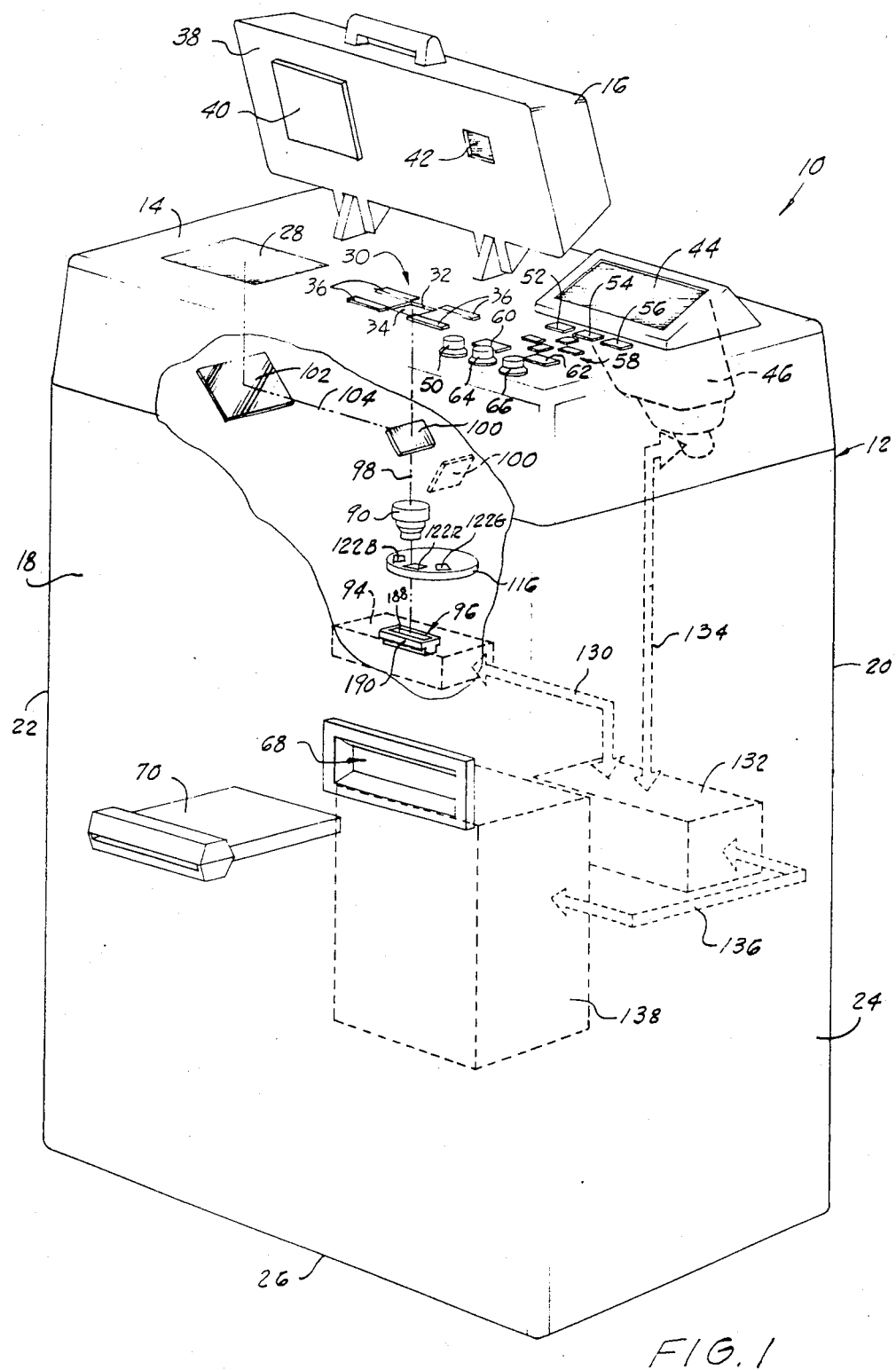
FIG. 1 is a perspective view, partly cut away, of an electronic imaging copier embodying the present invention.
Figure 2:
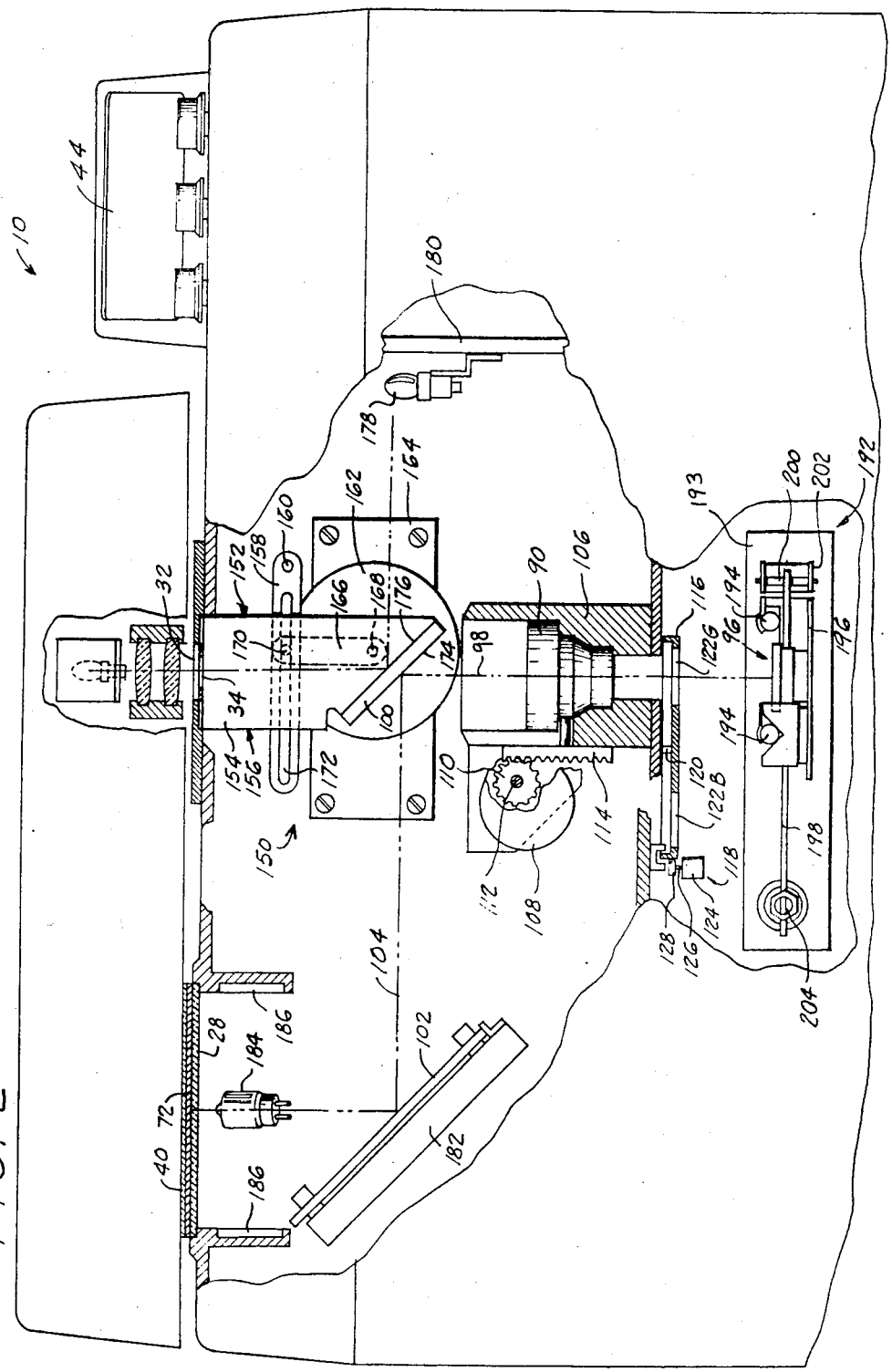
FIG. 2 is a front elevational view, partly cut away, and partly in section, of the upper portion of the copier of FIG. 1.
Figure 3:
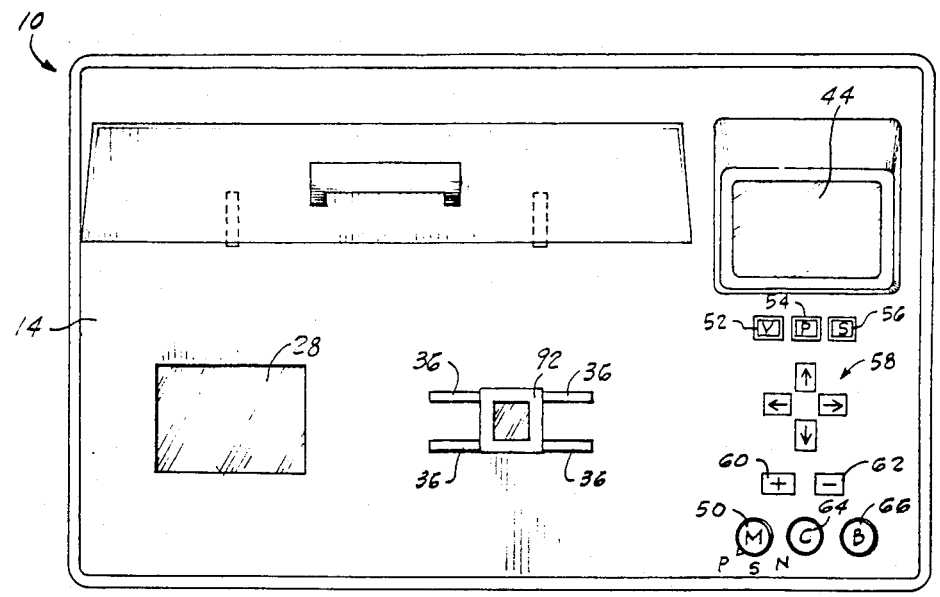
FIG. 3 is a top plan view of the copier.

With reference to FIGS. 1, 2 and 3, the present invention provides an electronic imaging copier 10 for making enhanced photograhic copies of original photographs including reflection prints, slides and negatives.

In the illustrated embodiment, copier 10 is a free standing unit enclosed in a generally parallelepiped shaped housing 12 defined by a top wall 14, having a hinge cover section 16 coupled to the rear portion thereof; a forward wall 18; a rear wall 20; a pair of oppositely disposed side walls 22 and 24; and a bottom wall 26.

Mounted on the left hand end of top wall 14 is a rectangular transparent print supporting window 28. To the right of window 28 is a transparency support station 30 comprising a square 35 mm slide receiving and supporting well or depression 32 in wall 14, having centered therein a rectangular transparent window 34 that is just slightly larger than the 35 mm film frame area of a slide; and two sets of longitudinally extending channel members 36 for receiving the opposed lateral edges of a 35 mm film strip to facilitate aligning an image frame thereon with the window 34.

The cover section 16 includes, on a forward wall 38 thereof, a pressure pad 40 which overlies window 28 when cover section 16 is closed and presses a print into flat engagement with window 28; and a transparent window 42 which overlies window 34 when the cover section 16 is closed and through which light, from a later to be described transparency illumination system in cover section 16, is transmitted to backlight a slide or negative frame registrated with window 34.

Mounted on the right hand end of wall 14 is a preview display window 44 for viewing an electronic image displayed on a display device, such as the illustrated CRT 46 mounted on the underside of wall 14 in alignment with window 44.

In front of window 44 is a plurality of operator actuable switch buttons and control knobs which allow the operator to interactably provide selected input signals to copier 10 for making selected modifications to the image displayed on CRT 46 and for controlling the mode and sequence of operation of copier 10.

Mode selection is controlled by actuating a three position mode selector knob 50 which is movable between print, slide and negative copying positions. Operational sequence is selected with a preview display button 52; a print or copy button 54; and a stop or cycle abort button 56.

The displayed image may be modified in terms of format (cropping or scrolling) image size (zoom capability), brightness, and contrast.

Selective cropping is achieved by actuating selected ones of the arrow buttons disposed in the cluster 58 which are effective to scroll the image displayed on CRT 46. Zoom control is provided by a plus (+) button 60 which effects image magnification and a minus (−) button 62 which effects image reduction. Brightness and contrast may be adjusted by turning knobs 64 and 66 respectively.

In the illustrated preferred embodiment, copier 10 is configured for utilizing self-developing film to provide copy prints in a minimum amount of time. As such, it includes a rectangular opening 68 in forward wall 18 through which a self-developing film holding and processing cassette 70, of conventional construction, is adapted to be slidably inserted to locate a self-developing film unit therein at a later to be described exposure plane within housing 12.

Figure 4:
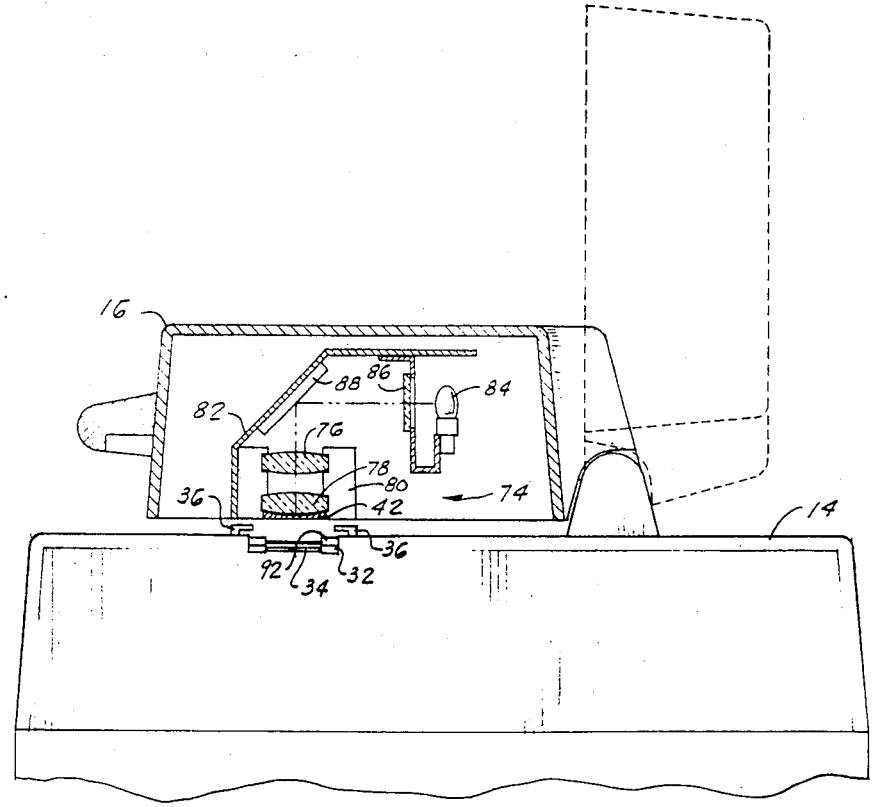
FIG. 4 is a side elevational view, partly in section, of the upper portion of the copier.

As best shown in FIG. 4, the cover section 16 is pivotaly movable between an open or raised inoperative position, shown in dotted lines, and a closed operative position, shown in solid lines, wherein it is in position to press an original print 72 against window 28 or transmit light through a transparency supported at station 30.

Cover section 16 is hollow and has a transparency illumination system 74 disposed therein. System 74 comprises a pair of condensing lenses 76 and 78, mounted in a housing 80, disposed in optical alignment with transparent window 42; and a sheet metal support frame 82 mounting a lamp or light source 84; a light difusser plate 86 and a mirror 88 set at an angle of 45° to the optical axis of the condensing lens set for reflecting light from lamp 84 that passes through this diffuser plate 86 onto the condensing lens set which serves to concentrate the light and direct it in a beam through window 42 to backlight a slide or negative frame aligned with the window 34 of station 30.

Copier 10 has optical means, including a movable objective lens 90, for forming an image of a print 72, supported at a first object plane defined by the top surface of window 28, or a transparency (e.g. 35 mm slide 92), supported at a second object plane defined by the stucture of station 30, at an image plane 94 where the optical image is sensed and converted into electronic image signals by a photoresponsive device, such as the illustrated CCD (Charge Couple Device) 96 that is adapted to scan across the image a line at a time.

The lens 90 is located below and in alignment with the transparency support station 30 with its optical axis 98 in alignment with the transparency window 34 to define a straight line optical path to the image plane 94 directly below lens 90.

Disposed between lens 90 and window 34 is a pivotally mounted mirror 100 that is movable between an inoperative transparency imaging or copy mode position, shown in dotted lines, where it is removed from the optical path between window 34 and lens 90 so as not to block image bearing light projected through window 34 onto lens 90, and a print copy mode position, shown in solid lines, where mirror 100 is set at 45° to axis 98 where it cooperates with a fixed 45° mirror 102, located below window 28, to define a folded optical path 104 between window 28 and lens 90. A mechanism for pivoting the mirror 100 between its two positions will be described later. As is apparent, mirrors 100 and 102 form part of said optical means.

Figure 6:
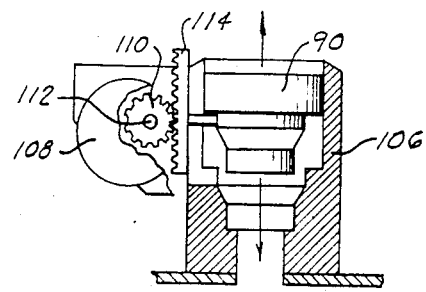
FIG. 6 is an elevational view, partly in section, of a device for moving an objective lens.

As best shown in FIGS. 2 and 6, the lens 90 is mounted for vertical movement, in the direction of axis 98, between its lowermost print imaging position, as shown in FIG. 2, and a higher or raised transparency imaging position, shown in FIG. 6. The lens 90 is slidably mounted in a vertical guide and supporting column 106 and is driven between its print and transparency imaging positions by a stepper motor 108 that has a pinion gear 110, on its output shaft 112, in mesh with a vertically disposed rack 114 connected to the lens 90. The operation of motor 108 is controlled by a later to be described control circuit.

The illustrated copier 10 is configured to copy color prints and transparencies by acquiring separate electronic signal records of the red, green, and blue components of the print or transparency. As such, copier 10 is provided with means for sequentially presenting green, red, and blue color filters into the optical path between the exit pupil of lens 90 and the image plane 94.

Figures 7, 10, 11:
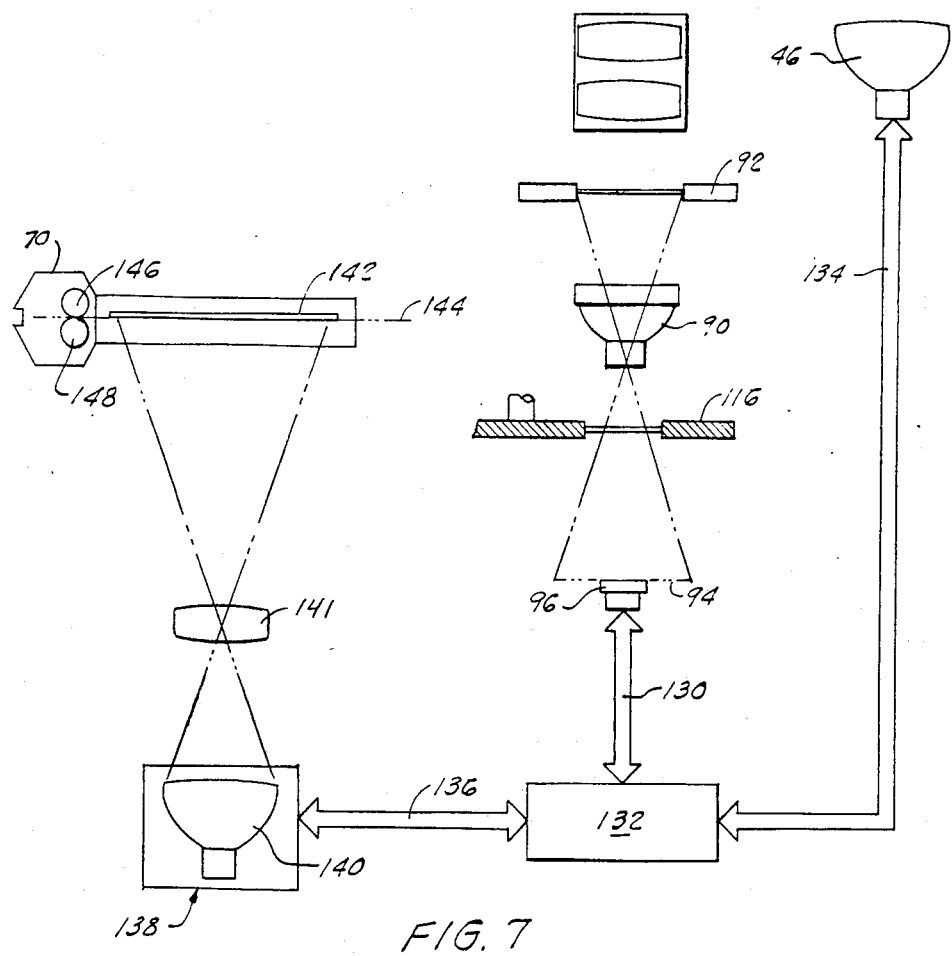
FIG. 7 is a diagrammatic illustration showing the optical paths and data transmission paths between selected components of copier 10.
FIGS. 10 and 11 are diagrammatic illustrations of an electronic image magnification technique.

As best shown in FIGS. 1, 2 and 7, the filter presenting means includes a filter wheel 116 and a filter wheel drive or indexing assembly 118.

The filter wheel 116 is adapted to rotate about a central axle shaft 120 and has at least one, and preferably two, sets of green, red, and blue filters 122g, 122r, and 122b, respectively, disposed in sequence about the circumferential edge of wheel 116. Wheel 116 is rotatably mounted on shaft 120 to the left of and just below lens 90 for rotation in a horizontal plane such that each filter 122 is sequentially presented in the optical path between the exit pupil of lens 90 and the image plane 94.

The wheel drive assembly 118 comprises a stepper motor 124 having an output drive shaft 126 that carries a capstan wheel 128 fixed thereto such that it frictionally engages the outer edge of wheel 116 to rotatably drive the wheel in response to the operation of motor 124 which is controlled by the later to be described control system.

As will become apparent later, during the course of a copy cycle, copier 10 will first make a low resolution scans of the green, red and blue components of the image provided by lens 90 and then a higher resolution scans of these three color components. Therefore, wheel 116 preferably includes two sets of three filters (six filters in all) equally spaced about the periphery so that both the low and higher resolution scans may be made by indexing wheel through a single 360° revolution. If wheel 116 only has one set of color filters thereon, it will have to rotate through two full revolutions to make the low and higher resolution scans, or its direction would have to be reversed after the low resolution scans to bring the first color filter 122g back to the operative position in alignment with lens 90 before starting the higher resolution scan.

Electronic image signals from photoresponsive device 96 are sent over a diagrammatically illustrated signal bus 130 to a signal processing apparatus or unit 132. Apparatus 132 includes later to be described first and second signal processors along with other components.

The first signal processor is operative during the preview display mode and has an associated frame buffer which stores image signals representative of an initial low resolution scan of the image provided by lens 90. These image signals are sent to an internal video generator which in turn provides video rate signals over a signal bus 134 to the display CRT 46 so that the operator may view the image through window 44.

Thereafter, the first signal processor is responsive to operator actuable input signals, provided in response to activation of select ones of the image modification buttons and knobs, for modifying the image signals in the frame buffer to change selected image parameters such as image magnification, format, contrast and brightness. The image modifications are made interactively. That is, the operator provides a modification input signal and the modified image is displayed on CRT 46. The operator may continue to make changes and view the newly modified image until he is satisfied with the results and then initiate the copy cycle by actuating print button 52.

It should be understood that image modification is optional. The operator may be satisfied with the initial image and proceed directly to the copying mode without making changes thereto.

The signal processing apparatus 132 is adapted to remember the final modifications, if any, and upon initiation of the copy mode incorporates these modifications into the electronic image signals provided during subsequent scans made for image enhancement and copying purposes.

As noted earlier, the copy mode includes low resolution scans of the green, red, and blue components followed by higher resolution scans of the three color components. These copy mode scans are handled by the second signal processor which provides certain image enhancements.

The first three color low resolution scans are made and the corresponding electronic image signals in this first set are stored memory. During the higher resolution scans, the second signal processor processes both the low resolution signals provided from memory and the higher resolution signals in the second set to provide a third set of signals representative of an enhanced version of the image. Enhancements may include adjustments to color balance, saturation, hue, etc. and other modifications including improvement in edge sharpening, etc.

As best shown in FIGS. 1 and 7, the enhanced image signals are sent from signal processing apparatus 132, over signal bus 136, to an electronic imaging film recorder 138 which includes a printing CRT 140 for forming an optical image that is projected by a projection lens 141 onto a self-developing film unit 142 located at an exposure plane 144 in the film holding and processing cassette 70.

Following exposure of film unit 142, it is advanced between a pair of pressure-applying rollers 146 and 148, located at the leading end of cassette 70, to effect distribution of a processing fluid between selected layers of the film unit and thereby initiate a development and diffusion transfer process that is well known in the photographic art.

Copier 10 may be configured for use with a variety of self-developing film units, including self-developing film units marketed by Polaroid Corporation, Cambridge, Mass. Color print film may be of the peel-apart or integral type. For representative examples of each, see commonly assigned U.S. Pat. Nos. 2,983,606 and 3,594,165 which are incorporated by reference herein.

Although copier 10 is most useful for making color copy prints, it may be configured to work with black and white print film or color and black and white transparency film. Also, by providing an image reversal mirror between lens 141 and exposure plane 144, copier 10 may be adapted for use with an integral film units, such as SX-70 film or the like, which requires an image reversal in the exposure bath.

The film holding in processing cassette 70 may be of the type which requires the operator to manually pull the exposed film unit between the rollers 146 and 148 or it may have motor driven rollers. For examples of cassettes 70 which may be used in copier 10, see commonly assigned U.S. Pat. Nos. 4,299,471 and Des. 244,089 which are incorporated by reference herein.

Figure 5:
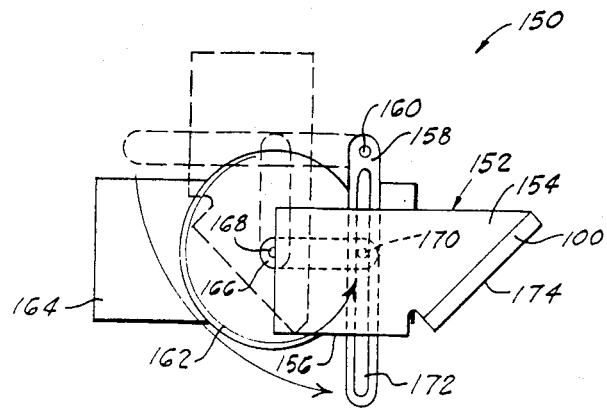
FIG. 5 is a front elevational view showing the operative position of a mirror support frame in dotted lines and its inoperative position in solid lines.

As noted earlier, copier 10 is switched between it print and transparency copying modes by moving mirror 100 between its operative print imaging position, shown in FIG. 2, and its inoperative transparency imaging position shown in solid lines in FIG. 5. This movement is provided by a mirror support and drive assembly 150.

Assembly 150 includes a mirror support frame 152 which is a hollow, three-sided member defined by a forward wall 154, and identical oppositely spaced rear wall (not shown), and a relatively short left side wall 156, as viewed in FIG. 2, joining the upper lateral edges of the forward and rear walls. The right side of frame 152 is open. The lower ends of the forward and rear walls are angled at 45° to the optic axis 98 and have the mirror 100 attached thereto to set it in operative relation to the lens 90 and the mirror 102 to define folded path 104 when frame 152 is in the print imaging position.

The mirror support frame 152 has an elongated slotted link 158 secured to the rear wall thereof. The right hand end of link 158 is pivotally connected to an internal support member (not shown) within housing 12 at pivot pin 160 for pivotal movement between the vertically disposed print imaging position, shown in solid lines in FIG. 2 and in dotted lines in FIG. 5, and the inoperative horizontally disposed transparency imaging position shown in FIG. 5 wherein the support frame 152 and the mirror 100 thereon have been moved out of the optical path between window 34 and lens 90 so as not to interfere with or block the optical path.

Assembly 150 further includes means for pivoting frame 152 between its two positions in the form of a stepper motor 162, mounted on a support plate 164, and a drive link 166 having one end fixedly connected to the motor drive shaft 168 and a connecting pin 170 on its opposite end which extends into an elongated slot 172 in link 158.

In response to driving motor 162 in the counter clockwise direction, link 166 causes link 158 to pivot in the counter clockwise direction about pin 160 thereby pivoting frame 152 from the operative print imaging position to the inoperative transparency printing position. The frame 152 is returned to the print imaging position by simply reversing the direction of motor drive and stepping the motor through the same number of steps. The operation of motor 162 is controlled by the later to be described control circuit.

Copier 10 is configured such that the mirror support frame 152 is normally located in the print imaging position shown in FIG. 2. Advantageously, when located in this position, it serves an additional function of forming part of an illumination system for shining light through window 34 from the inside of housing 12 to illuminate the transparency support station when cover 16 is raised to facilitate correctly orienting a slide 92 in well 32 or registering an image frame on a negative film strip, engaged in channels 36, with respect to window 34.

In such an illumination system, mirror 100 is a double sided mirror. Its front reflective surface 174 is used to reflect light from mirror 102 to lens 90, and its rear reflective surface 176 is used to reflect light provided from a lamp 178, mounted to the right of surface 176 on a stanchion 180, through window 34.

As best shown in FIG. 2, the mirror 102 which is operative during the print imaging mode for reflecting an image of a print 72 on window 28 to mirror 100, is mounted on a planar mirror support block 182 that is mounted in a plane set at a 45° to the plane of window 28.

To illuminate the print 72 during the preview display and copy modes, copier 10 includes a print illumination system comprising a pair of oppositely disposed front and rear lamps 184 (only one shown) and a cooperating pair of oppositely and vertically disposed mirrors 186 set at 90° with respect to lamps 184. The lamps 184 and mirrors 186 are arranged in a box-like configuration just below window 28 where they are outside of the optical path between window 28 and mirror 102 and do not fall within the field of view of lens 90. The mirrors 186 reflect light from the lamps 184 and the reflected light combines with light emitted directly from the lamps 184 to more evenly illuminate the print 72.

The photoresponsive device 96 in the illustrated embodiment comprises a linear array CCD device 188 enclosed in a housing 190. As noted earlier, it is configured to be advanced or indexed across the image plane 94 a line at a time for simultaneously reading and providing separate brightness or intensity signals for each image pixel in a line. To provide a high quality reproduction, the array 188 has a resolution of approximately 2,000 dots or pixels/inch. One type of array 188 suitable for use in copier 10 is about one inch long and has 2,048 elements. That is, it is capable of separating each line of the image to be copied into 2,048 distinct pixels.

In the illustrated embodiment, the device 96 is adapted to be incrementally advanced across the image plane in 1,500 steps. In this manner the image scan by device 96 is divided into a matrix array of 2,048 × 1,500 pixels.

Figure 8:
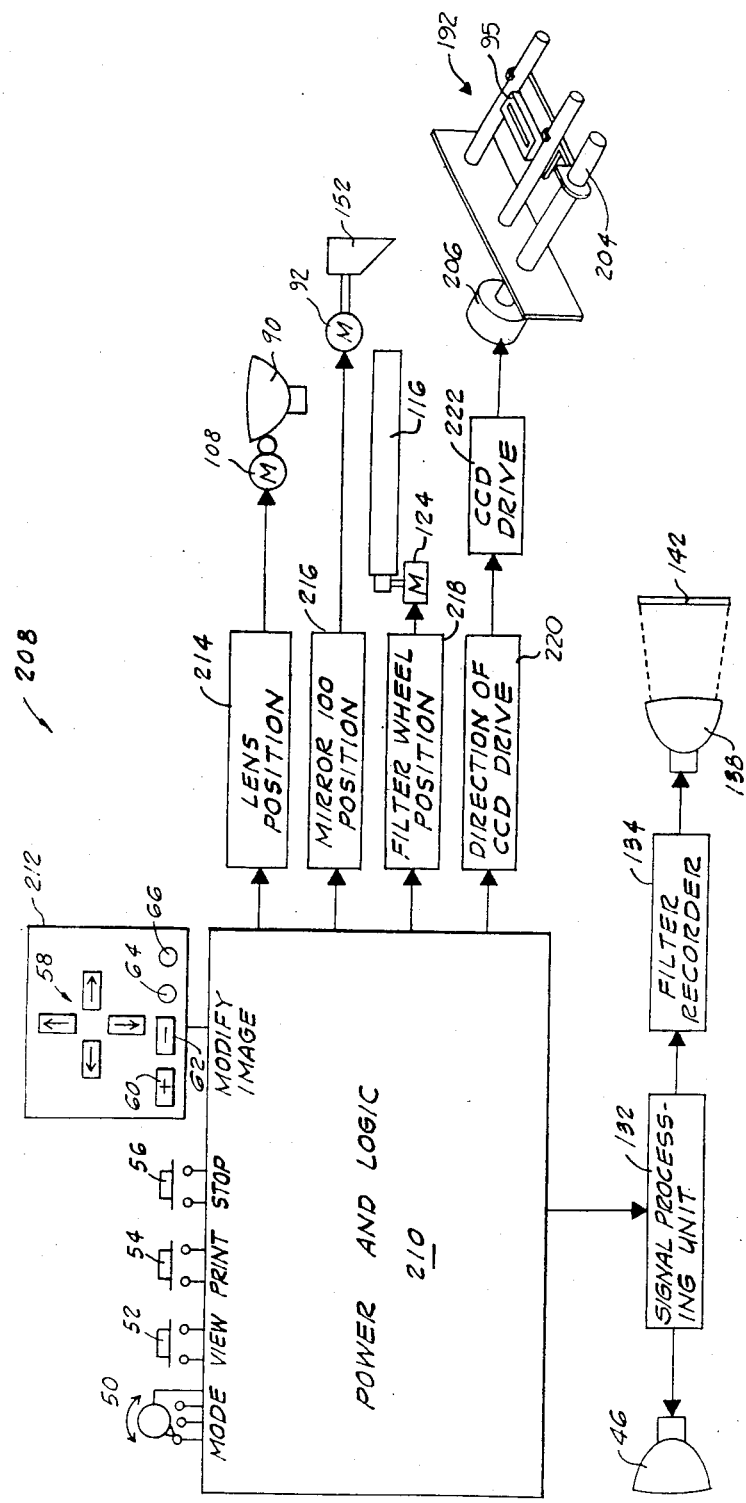
FIG. 8 is a diagrammatic representation of a system for controlling operation of the copier.

Copier 10 includes means for incrementally advancing or indexing the photoresponsive device 96 across the image plane 94 in the form of a precision indexing mechanism 192 which is best shown in FIGS. 2 and 8.

The indexing mechanism 192 includes a vertical support plate 193 having a pair of spaced-apart, horizontally disposed support and guide rods 194 extending outwardly therefrom and on which is slidably suspended a horizontally disposed carriage 196 mounting the upwardly facing photoresponsive device 96.

The carriage 196 is adapted to be reciprocally driven back and forth along rods 194, toward and away from plate 193, by a motion reducing pivoting lever 198. The fulcrum end (right hand end as viewed on FIG. 2) of lever 198 pivots about a pivot pine 200 mounted on a pin support 202 fixed to plate 193. The opposite end of lever 198 is coupled to a threaded linear actuator rod which extends through plate 193, parallel to the rods 194, and is reciprocally driven by a motorized linear actuator drive unit 206 on the back side of plate 193.

The carriage 196 is connected to the midpoint of lever 198 by a coupling pin which is captured in a lever notch (not shown). By connecting the carriage 196 to the midpoint of lever 198, a 2:1 reduction in carriage motion is achieved. That is, in response to advancing the actuator rod 204 through a given distance, the carriage 196 only moves half a given distance.

Device 96 is adapted to be moved so that the linear array 118 scans a centrally disposed rectangular field of the image plane 94 which measures approximately one inch wide (line length) by 0.75 inches deep (number of lines per image frame). The actuator assembly 192 is designed to advance the device 96 across the 0.75 inch deep field in 1,500 steps or 0.0005 inches per step. Because of the 2:1 motion production provided by the lever arrangement, the 0.0005 inch array steps may be made by advancing the actuator arm 204 0.001 inches per step.

This means that the overall cost of the indexing mechanism 192 is reduced because it is only necessary to employ an actuator assembly that is capable of accurately and reliably indexing at 0.001 inches per step rather than a higher precision and more costly actuator that is capable of advancing the actuator arm 204 in 0.0005 inch steps.

For a more detailed description of indexing mechanism 192, reference may be had to the previously noted commonly assigned copending application U.S. Ser. No. (804,595) filed on Dec. 4, 1985 which is incorporated by reference herein.

In the high resolution scan mode, the CCD device 96 is advanced sequentially to each of the 1,500 line positions, and the intensity signals are generated for each of the 2,048 pixels in the line. This generates approximately 3 megabytes of information for each of the three high resolution color scans. To avoid having to provide a very large random access memory to store these high resolution signals, copier 10 only stores the low resolution signals in memory and feeds the high resolution signals directly to the signal processor unit 132 where they are combined with select ones of the low resolution signals provided from memory to effect image enhancement.

In the low resolution scan mode, only about one quarter of the image information is acquired and stored in memory and/or the frame buffer so that the image is defined by a 512×375 pixel array. This is significant in that the use of this technique substantially lowers the memory requirement and cost of copier 10.

In one type of low resolution scanning scheme, the CCD 96 is indexed to read every fourth line. At each fourth line, a reading is not provided for each pixel, but rather the line is divided into blocks containing four consecutive pixels and an average intensity signal is provided for each block. Utilizing this scheme, the lower resolution scans can be completed in a shorter time period then the higher resolution scans because the CCD device 96 only has to stop at and read every fourth image line rather than every line.

It should be noted that other low resolution scanning schemes may be employed without departing from the spirit and scope of the invention involved herein. For example, in addition to averaging blocks of four pixels horizontally along the line, every line could be read and an average intensity signal could be provided for each vertical block of four lines. However, this would slow down the low resolution scanning rate.

In the preview display mode, an initial low resolution scan of the image provided by lens 90 is made through a green filter 122g and the corresponding display image signals are written into the frame buffer associated with the first signal processor. The signals are then sent to the video generator which drives the display 46 to display a low resolution (512×375 pixels) black and white version of the image.

If, for example, the operator finds that the subject of principal interest only comprises a portion of the full image frame, he may choose to electronically enlarge the image by pressing the plus (+) button 60 one or more times, to progressively increase the image size and then use the arrow buttons in cluster 58 to electronically scroll the image (up, down, left, or right) so that the enlarged subject of principal interest is in the desired location on the screen. Image magnification (or reduction) typically may be made in steps in response to each successive actuation of button 60. For example, copier 10 may be configured to provide enlargements or reductions in four steps of 1.25X; 1.50X; 1.75X and 2.0X; or it may employ other schemes utilizing more or less steps and/or different magnification ranges.

Various techniques for electronically manipulating signals defining an image to change image magnification (zoom capability); display selected portions of an enlarged image that exist in the frame buffer that are currently "off screen" (scrolling) and making adjustments to brightness and/or contrast are well known in the electronic imaging art and may be incorporated into copier 10 to provide the preview display mode functions described herein.

The general principles of a zoom technique which may be used in copier 10 to provide image magnification will be explained with reference to FIGS. 10 and 11. In these two figures, the array of 16 boxes arranged in a 4×4 matrix of rows, designated 1-4 and columns designated A–D, is representative of 16 memory addresses or cells in the frame buffer storage unit.

In FIG. 10, information designated P, X, Y, and Z, defining four adjacent pixels of different intensity in the image originally displayed on CRT 46 are stored in frame buffer addresses 1A, 1B, 2A, and 2B respectively.

Assume for the moment that the operator chooses to enlarge the displayed image by a factor of 2x. In response to such input signals, the first signal processor will manipulate this stored information to produce the results shown in FIG. 11.

First, the active addresses are sampled to determine the intensity value information stored therein. Then, value X is deleted from address 1B and is put into address 1D; value Y is deleted from 2B and is put into 4A; and value Z is deleted from 2B and is put into 4D. The value P remains in address 1A.

If the contents of the frame buffer were displayed now, image quality would be substantially degraded because the four original pixels would appear to be spread out over an area of the display screen that is four times larger than the area in which the four pixels were originally displayed. To improve the quality of the electronically enlarged image, the scheme is operative to fill in the empty intervening memory addresses with appropriate corresponding intensity values determined during the sampling. That is, the nearest neighbor addresses, 1B, 2A and 2B of address 1A receive the value P; addresses 1C, 2C and 2D receive the intensity value X; —etc— to produce the results shown in FIG. 11. When the image is enlarged in this manner, there will, of course, be some loss of resolution because now the apparent pixel size is increased by a factor of 4X.

While the illustrated image magnification scheme fills in the next neighbor addresses with the same value determined by the original sampling, the scheme may be modified for using interpolation techniques to fill in the spaces with intermediate density values to provide a smoother tonal transition between adjacent pixels that differ greatly in intensity value.

With reference to FIG. 8, control over the operation of copier 10 is provided by a diagrammatically illustrated control system 208 which includes a power and logic circuit 210 that provides electrical power to various copier components and subsystems and also provides the necessary logic functions to operate these components and subsystems in a coordinated manner. The logic section of circuit 210 preferably includes a microcomputer which is programmed to execute the sequence of operations making up a preview display and print or transparency copy cycle.

Circuit 210 responds to input signals provided when the operator manually actuates the mode knob 50; the cycle sequence switches 52, 54 and 56, and the image modifying controls (collectively designated 212); and provides appropriate output control signals to various subsystems including the signal processing unit 132; a lens position circuit 214 which operates lens drive motor 108; a mirror 100 position circuit 216 which operates drive motor 162; a filter wheel position circuit 218 which operates filter wheel motor 124; and a circuit 220 which determines the direction of CCD drive and, in turn controls the operation of a CCD drive circuit 222 that drives the linear actuator motor 206.

As noted earlier, one of the major advantages of copier 10 is that it is capable of electronically enhancing an image before it is projected onto the copy film 142. Enhancements may include color balancing; matching color and contrast range to the characteristics of the copy film; manipulation of saturation and hue; edge sharpening; and reversing the image using inverse video techniques that are well known in the art. By using inverse video, copier 10 may make a positive print from a negative image slide or film frame supported at station 30.

For examples of image enhancement techniques that may be incorporated into copier 10, reference may be had to the previously noted commonly assigned U.S. Pat. Nos. 4,488,244 and 4,536,848 along with commonly assigned copending applications U.S. Ser. Nos. 681,788, filed on Dec. 14, 1984 and 682,894 filed on Dec. 18, 1984.

Figure 9:
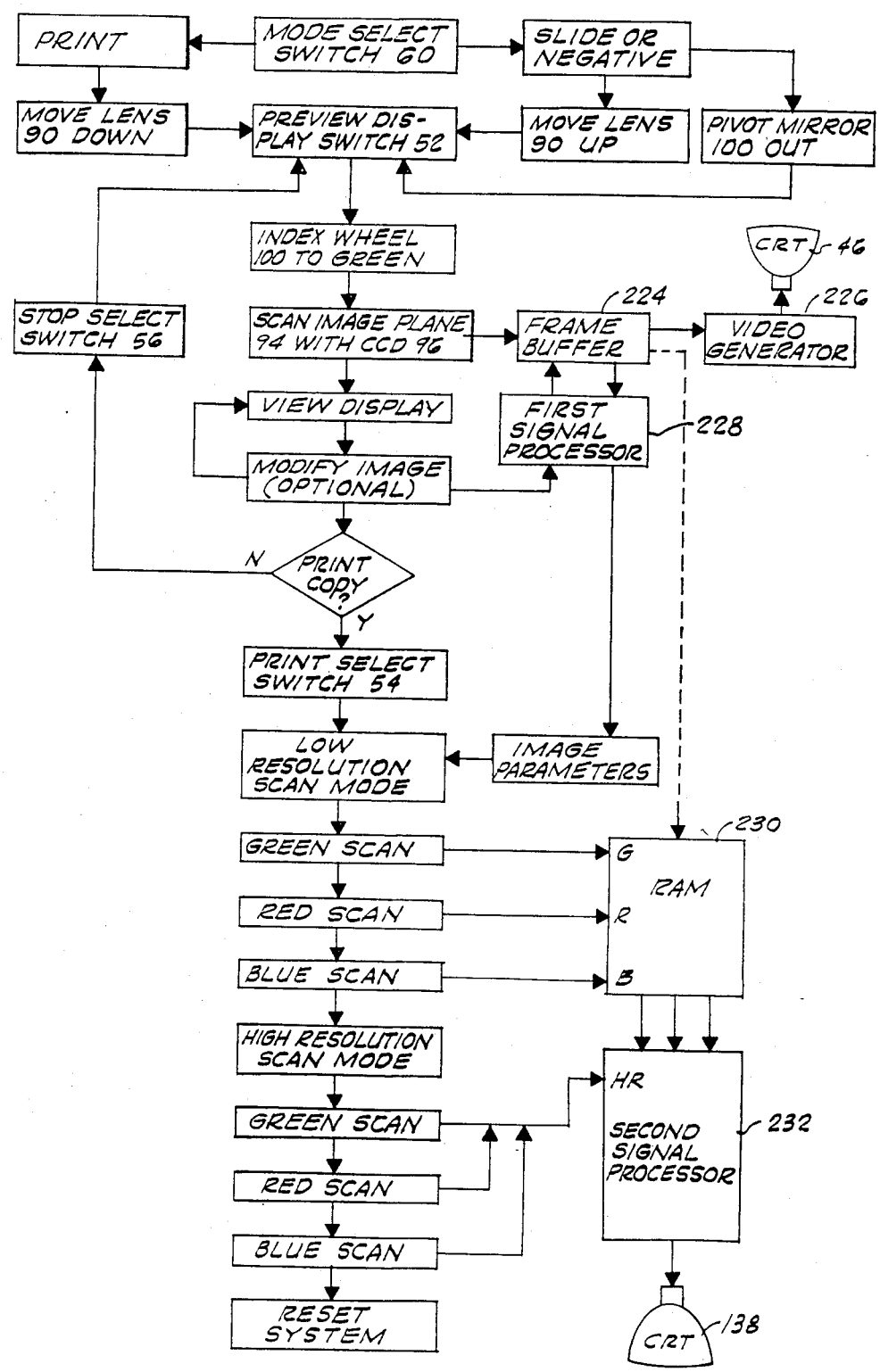
FIG. 9 is a flow diagram showing the sequence of operations in a print or transparency copying cycle.

The operation of copier 10 now will be described with reference to the flow diagram shown in FIG. 9. In this diagram, selected components of the signal processing unit 132 are shown separately. These components include a frame buffer 224; a video generator 226 for driving CRT 46; a first signal processor 228 which is operative to effect image modifications; a random access memory (RAM) 230; and a second signal processor 232 which is operative to effect image enhancements.

The operator initially moves the cover section 16 to its raised position thereby closing a normaly open microswitch (not shown) which energizes lamp 178 so that light shines through window 34 in the slide receiving well 32.

If an original print 72 is to be copied, it is placed face down on window 28. If the original photograph is a slide 92 it is placed in support well 32, or if it is a negative image 35 mm film strip, the edges thereof are inserted into the guide channels 36 and it is moved along the channels to register the selected frame with window 34. Once the original photograph is in place, cover 16 is closed (shutting off lamp 178) and the operator turns the mode select knob 50 to the appropriate print or transparency position.

If the print copy mode is selected, circuit 210 responds by activating lens position circuit 214 which in turn moves the lens 90 down to its lowermost print imaging position shown in FIG. 2. If one of the transparency modes is selected, circuit 210 activates circuit 214 to move the lens 90 up to its transparency imaging position and it additionally activates the mirror position circuit 216 to pivot the mirror support 152 from the initial print imaging position to its inoperative position shown in solid lines in FIG. 5.

Following mode selection, the user initiates the preview display mode by actuating switch 52. Circuit 210 responds by turning on the appropriate one of the print and transparency illumination systems, activating the filter wheel positioning circuit 218 to locate the green filter 122g in alignment with lens 90, and then activating circuit 220 which in turn activates circuit 222 to operate the indexing mechanism 192 which scans the CCD 96 across the image plane 94 to provide a display set of low resolution signals representative of the green component of the image provided by lens 90. These image signals are sent to frame buffer 224 and are supplied therefrom to the video generator 226 which drives CRT 46 to display the image thereon.

The operator views the displayed image and if he is satisfied with results, he actuates the print select switch 54 to initiate the copy mode. Alternatively, the operator may modify the image by actuating selected ones of the image modfying control switches in the group 212.

Input signals from these modification switches activates the first signal processor 228 which manipulates the signals in the frame buffer 224 to provide the selected modifications. Once again the signals are fed to the video generator 226 to display the image on CRT 46. The operator may continue to interactively modify the image in this manner until he is satisfied with the results and then initiate the copy mode by pressing the print select switch 54.

The operator may terminate the preview display mode at any point by pressing the stop select switch 56. The operator may choose to do this if he wants to reposition the original photograph or abort this cycle to replace the original photograph with another one. After making any such change, the preview display cycle may be initiated again by actuating the preview display switch 52.

In response to actuation of the print select switch 52, circuit 210 responds by initiating the low resolution scan mode. If the image was modified during the preview display mode, the first signal processor 228 would provide a set of signals which are effective to apply the final modifications to the subsequent low and high resolution scans.

At the beginning of the low resolution scan mode, the CCD is reset to its initial position and, with the green filter 122g in place, the CCD 96 is advanced across image plane 94 to acquire electronic image signals representative of the green component of the image which are fed to and stored in the RAM 230. Following the green scan, the filter wheel 116 is indexed to present the red filter in alignment with lens 94, the CCD is reset to its initial position, and then it is advanced across the image plane 94 to provide image signals representative of the red component which are also stored in RAM 230. The red scan is followed by a low resolution blue scan and the low resolution blue component image signals are also stored in RAM 230. Thus, a first set of copy image signals are stored in RAM 230.

As noted earlier, in the low resolution scan mode, the CCD 96 is indexed so that it reads only every fourth line and provides an average intensity signal for blocks of four pixels along the line.

In the high resolution scanning mode, filter wheel 116 is indexed to present the second green filter 122g in alignment with lens 90 and the CCD device 96 is reset to its starting position. This is followed by the high resolution scan of image plane 94 to acquire the high resolution green component copy signals which are fed directly, a line at a time, to the image enhancing second signal processor 232. Processor 232 also receives from memory 230 the low resolution green, red and blue components of the image which it selectively combines with the high resolution component to provide enhanced green component signals which are fed to the output display CRT 138 for exposing the film unit 142.

As each line is scanned, the high resolution signals for that line undergo enhancement and are fed through CRT 138 to expose the film unit 142 so that the film unit is exposed sequentially, a line at a time.

Then, circuit 210 indexes the wheel 116 to present the second red filter 122r in alignment with lens 90 and resets the CCD 96 to its initial position. The image plane 94 is scanned with the CCD 96 to provide the high resolution red component signals which are fed to the signal processor 232 for enhancement and then to the CRT 138 to expose the film unit 142 with the red component of the enhanced image.

Following exposure of the red component, circuit 210 once again resets the CCD 96 and indexes the filter wheel 116 to present the second blue filter 122g in alignment with lens 90 and then initiates the high resolution blue component scan. After the film unit 142 has been exposed to the blue component, the film is processed by advancing it between the pair pressure applying rollers 146 and 148 to initiate a development in the fusion transfer process that is well known in the art.

Following the high resolution blue component scan, circuit 210 resets the varies system components to their initial state. If the transparency copy mode was selected, the reset operation would include activating mirror position circuit 216 to pivot the mirror support 152 back to the initial position shown in FIG. 2.

In the method described above, the optical image provided by lens 90 was scanned during the preview display mode through the green filter to provide image signals to frame buffer 224 and then once again in the low resolution mode to provide green component signals to RAM 230. Alternatively, the low resolution green scan mode may be eliminated by using the display mode results for the green component and transferring these signals from the frame buffer 224 to RAM 230.

In the illustrated embodiment, copier 10 is configured to display a black and white image in the preview display mode. However, it is within the scope of the invention to provide a color preview display. To do so, the CRT 46 would be of the color type and the display of the image would be delayed until low resolution green, red and blue signals were stored in the frame buffer 224 at which point all three color component signals would be fed through the video generator 226 to the CRT 46.

Because certain other changes and modifications may be made to the above described electronic imaging copier without departing from the scope and spirit of the invention involved herein, it is intended that all matter contained in the above description and accompanying drawings be interpreted as illustrative and not in a limiting sense.

What is claimed is:

1. An electronic imaging copier for making an enhanced photographic copy of a photograph, said copier being initially operable in an interactive preview display mode for viewing and selectively modifying an electronically displayed image of the photograph and thereafter being operable in a copying mode for producing an enhanced copy, said copier comprising:
   means for supporting a photograph at an object plane;
   optical means for providing an optical image of the supported photograph at an image plane;
   photoresponsive means for sensing an image provided at said image plane and being selectively operable to provide, in sequence, a first set of electronic image signals representative of a low resolution version of said image and a second set of electronic image signals representative of a higher resolution version of said image;
   memory means for storing said first set of image signals;
   display means responsive to at least a portion of said first set of signals for displaying a low resolution version of said image;
   first signal processing means being selectively operable during said preview display mode and responsive to operator actuable input signals for processing said portion of said first set of signals provided to said display means to modify selected image defining parameters and, if modifications are made during said preview display mode, being operative during said copy mode for processing subsequent signals in said first and second sets to apply said selected modifications thereto;
   second signal processing means for processing said first and second set of image signals, subsequent to any modifications by said first signal processing means, to provide a third set of signals representative of an enhanced version of said image;
   means for supporting a photosensitive film unit at an exposure plane; and means responsive to said third set of signals for providing an optical image representative of said enhanced image and for projecting said enhanced image onto said exposure plane to record it on a film unit thereat.

2. The copier of claim 1 further including operator actuable image modification means for providing image modification input signals to said first signal processing means;

3. The copier of claim 2 wherein said image modification means are operative to change image magnification;

4. The copier of claim 3 wherein said image modification means are operative to scroll the image displayed by said display means to provide selective cropping;

5. The copier of claim 4 wherein said image modification means are operative to adjust image contrast and brightness;

6. An electronic imaging copier for making enhanced photographic copies of reflection print and transparency types of photographs, said copier being initially operable in an interactive preview display mode for viewing and selectively modifying an electronically displayed image of the photograph and thereafter being operable in a copying mode for producing an enhanced copy, said copier comprising;

means for supporting a print at a first object plane;

means for supporting a transparency at a second object plane;

optical means being selectively operable in a print copying mode for providing an optical image of a supported print at an image plane, and in a transparency copying mode for providing an optical image of a supported transparency at said image plane;

photoresponsive means for sensing an image provided at said image plane and being operative to provide, in sequence, a display set of electronic image signals representative of a low resolution version of said image, a first set of copy image signals representative of a low resolution version of said image, and a second set of copy image signals representative of a higher resolution version of said image;

memory means for storing said display set and said first and second sets of copy image signals;

display means responsive to said display set of signals for displaying a low resolution version of said image;

first signal processing means being selectively operable during said preview display mode and responsive to operator actuable input signals for processing said display set of signals to modify selected image defining parameters and, if modifications are made during said display mode, being operative during said copying mode for applying said selected modification to said first and second sets of copy signals;

second signal processing means for processing said first and second sets of copy signals, whether modified or not, to provide a third set of copy signals representative of an enhanced version of said image;

means for supporting a photosensitive film unit at an exposure plane; and means responsive to said third set of copy signals for providing an optical image representative of said enhanced image and for projecting said enhanced image onto said exposure plane to record it on a film unit thereat.

7. The copier of claim 6 wherein said optical means includes an objective lens aligned with said transparency supporting means, a first mirror for reflecting light from a supported print and a second mirror mounted for movement between an inoperative transparency imaging position wherein it is displaced from an optical path between said transparency supporting means and said lens, and an operative print imaging position wherein said second mirror is in position to reflect light from said first mirror to said lens.

8. The copier of claim 7 wherein said copier includes a housing having a horizontal top wall, said print supporting means includes a first transparent window in said top wall on which a print to be copied is placed to locate it at said first object plane and said transparency supporting means includes a depression in said top wall having a second transparent window therein, said depression being dimensioned to receive and support a 35 mm slide with the image frame portion thereof in registration with said second window.

9. The copier of claim 8 wherein said transparency supporting means further includes means for supporting a 35 mm negative film strip on said top wall whereby it is slidably movable relative to said depression to facilitate registering a selected image frame thereon with said second window.

10. The copier of claim 9 including a light source within said housing and wherein said second mirror is a double sided mirror and serves to reflect light from said source through said second window when said second mirror is in its said operative position.

11. The copier of claim 10 further including a cover section movable between an open raised position and a closed position wherein it overlies said second window, said cover section including a transparency illumination system therein for backlighting a slide or film strip image frame registered with said second window when said cover section is in its closed position.

12. The copier of claim 11 wherein said cover section also overlies said first window when in said closed position, and said cover section also includes means for pressing a print against said first window.

13. The copier of claim 6, further including operator actuable image modification means for providing image modification input signals to said first signal processing means;

14. The copier of claim 13 wherein said image modification means are operative to change image magnification.

15. The copier of claim 14 wherein said image modification means are operative to scroll the image displayed by said display means to provide selective cropping.

16. The copier of claim 15 wherein said image modification means are operative to adjust image contrast and brightness.

* * * * *